United States Patent
Honma et al.

(10) Patent No.: US 6,840,991 B2
(45) Date of Patent: Jan. 11, 2005

(54) ASPHALT EMULSION COMPOSITION

(75) Inventors: Yuichi Honma, Wakayama (JP); Ryoichi Tamaki, Wakayama (JP); Hirotaka Sasaki, Wakayama (JP)

(73) Assignee: Kao Corporation, Tokyo (JP)

( * ) Notice: Subject to any disclaimer, the term of this patent is extended or adjusted under 35 U.S.C. 154(b) by 109 days.

(21) Appl. No.: 10/041,491

(22) Filed: Jan. 10, 2002

(65) Prior Publication Data

US 2002/0144628 A1 Oct. 10, 2002

(30) Foreign Application Priority Data

Jan. 24, 2001 (JP) ........................................ 2001-015687
Oct. 15, 2001 (JP) ........................................ 2001-316340

(51) Int. Cl.[7] ........................ C08L 97/00; C09D 197/00; C09J 197/00
(52) U.S. Cl. ................ 106/123.13; 106/277; 106/284.4
(58) Field of Search ............................ 106/123.13, 277, 106/284.4

(56) References Cited

U.S. PATENT DOCUMENTS

| | | | | |
|---|---|---|---|---|
| 4,017,419 A | * | 4/1977 | Ludwig et al. ............... | 516/43 |
| 4,721,529 A | * | 1/1988 | Mullins .................. | 106/284.06 |
| 5,320,671 A | | 6/1994 | Schilling ..................... | 106/277 |
| 5,328,505 A | | 7/1994 | Schilling ..................... | 106/277 |
| 5,776,234 A | * | 7/1998 | Schilling ..................... | 516/47 |
| 5,928,418 A | * | 7/1999 | Tamaki et al. .............. | 106/277 |
| 6,077,888 A | * | 6/2000 | Schilling ..................... | 524/76 |
| 6,494,944 B1 | * | 12/2002 | Wates et al. ................. | 106/277 |
| 6,540,822 B2 | * | 4/2003 | Wates et al. ................. | 106/277 |

FOREIGN PATENT DOCUMENTS

| | | | |
|---|---|---|---|
| JP | 47/010426 | * | 5/1972 |
| WO | WO 99/58491 | | 11/1999 |

OTHER PUBLICATIONS

Derwent abstract of J)47/010426, May 1972.*

* cited by examiner

*Primary Examiner*—Helene Klemanski
(74) *Attorney, Agent, or Firm*—Birch, Stewart, Kolasch & Birch, LLP

(57) ABSTRACT

Provided is, particularly, a cationic asphalt emulsion composition which is scarcely affected by temperature during paving and by the characteristics of the aggregates to be used, can secure a sufficient time required to mix aggregates and enables slurry fluidity suitable for paving. The asphalt emulsion composition contains asphalt and water, the composition comprising kraft lignin (A) having a molecular weight of 4000 to 60000 and a specific polyamine (B) in each specific ratio to the asphalt emulsion composition.

13 Claims, No Drawings

ASPHALT EMULSION COMPOSITION

TECHNICAL FIELD

The present invention relates to an asphalt emulsion composition.

BACKGROUND ART

There is a method in which an asphalt emulsion obtained by stirring asphalt and water in the presence of an emulsifier is used after it is mixed with an aggregate as one of road paving methods. In such a use, a cationic asphalt emulsion which is emulsified by a cationic surfactant is used because of good adhesion to an aggregate.

As a paving method using a cationic asphalt emulsion, a chip seal method is known in which the cationic asphalt emulsion is displayed on a road surface and then aggregates are scattered thereon. However, this method has the problems such as inferior durability of the paved body and therefore, paving methods called slurry seal or microsurfacing have been proposed. This is a method in which an asphalt emulsion, an aggregate and water are separately mounted on a carrier car such that these materials are not in contact with each other and they are mixed using a mixer while the carrier car is running, to pave a road with the mixture.

However, the cationic asphalt emulsion largely varies in decomposition rate corresponding to the temperature of the aggregate and the characteristics (e.g., basic rock or acidic rock and water content) of the aggregate and the fluidity of the emulsion varies along with the change in decomposition rate. Therefore, in order to carry out proper paving, such works as to make pretests concerning the amount of a decomposition retardant to be added, the amount of water to be added and the like in advance are required. The slurry seal paving has various merits such as short paving time. However, since the cationic asphalt emulsion is used, the slurry seal paving has been insufficiently spread in such a situation as above mentioned. In actual, the slurry seal paving is practiced at present in a limited period of time which excludes high temperature and high moisture periods from the spring to the summer and during which the weather is relatively stable.

As examples of technologies used to solve these problems, U.S. Pat. Nos. 5328505, 5320671 and WO99/58491 are given. In U.S. Pat. Nos. 5328505 and 5320671, lignin is reacted with an polyamine to obtain an aminated lignin, which is used. Four or more hours are required to accomplish this reaction, giving rise to a problem concerning the productive efficiency of an emulsion. Also, in WO99/58491, a single branched polyamine is used for an asphalt emulsion. However, the time required for mixing aggregates may be secured insufficiently depending on the type of aggregate and it is desired to heighten commonness to aggregates, making it possible to secure the time required for mixing aggregates even if any type of aggregate is used.

DISCLOSURE OF THE INVENTION

It is an object of the present invention to provide an asphalt emulsion, particularly, a cationic asphalt emulsion which is unaffected by temperature during slurry seal paving and the characteristics of the used aggregates, makes it possible to sufficiently secure the time required for mixing aggregates without using a decomposition control agent and ensures slurry-fluidity suitable for paving.

The invention provides an asphalt emulsion composition comprising 0.01 to 10% by weight of a kraft lignin (A) (hereinafter referred to as component (A)) having a weight average molecular weight of 4000 to 60000 and 0.01 to 10% by weight of at least one polyamine (B) (hereinafter referred to as component (B)) selected from the group consisting of polyamines represented by the formula (1) and polyamines represented by the formula (2).

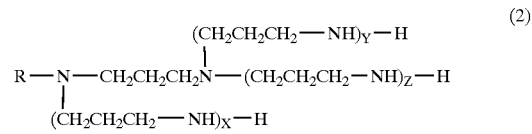

wherein R represents a saturated or unsaturated, straight-chain or branched hydrocarbon having 8 to 22 carbon atoms, m denotes a number from 2 to 10, X denotes a number from 1 to 5 and Y and Z denote a number from 0 to 5, provided that Y and Z are not 0 at the same time.

The asphalt emulsion composition contains asphalt and water.

The invention provides also a method for obtaining an asphalt emulsion by mixing asphalt and water by using 0.01 to 10% by weight of a kraft lignin (A) having a weight-average molecular weight of 4000 to 60000 and 0.01 to 10% by weight of at least one polyamine (B) selected from the group consisting of polyamines represented by the formula (1) and polyamines represented by the formula (2).

The invention further provides an asphalt emulsifier composition comprising a kraft lignin (A) having a weight-average molecular weight of 4000 to 60000 and at least one polyamine (B) selected from the group consisting of polyamines represented by the formula (1) and polyamines represented by the formula (2).

The invention also relates to an asphalt emulsifier composition comprising a kraft lignin (A) having a weight average molecular weight of 4000 to 60000, at least one polyamine (B) selected from the group consisting of polyamines represented by the formula (1) and polyamines represented by the formula (2), a nonionic surfactant (C) and water. The emulsifier composition may be used as an emulsifier for preparation of the above shown asphalt emulsion.

In the present invention, specific kraft lignin is used together and therefore a higher miscibility with aggregates than in the case of singly using a polyamine represented by the formula (1) or (2) is obtained irrespective of temperature during paving and the type of aggregate.

DETAILED DESCRIPTION OF THE INVENTION

Component (A)

Craft lignin as the component (A) is an aromatic polymer compound and one of major components constituting the cell wall of wood in combination with cellulose and other polysaccharides. Craft lignin is obtained in a step of producing chemical pulp by a kraft method and separated from polysaccharides primarily containing cellulose which is a major component of the pulp. Because lignin is generally eluted in waste fluid produced in the step, this waste fluid is concentrated and dried to isolate powdery kraft lignin, which is utilized as an industrial feed stock. Craft lignin contains a larger amount of a phenolic hydroxyl group than lignin isolated by other methods and is rich in chemical activity. Such industrially available kraft lignin may also be used in the present invention. The weight average molecular weight (hereinafter transcribed as Mw) of the above kraft lignin is 4000 to 60000, preferably 5000 to 50000 and more preferably 5000 to 20000. Here, Mw was measured using an analytical curve by a high speed GpC ((TOSOH) AS8000, manufactured by Tosoh Corporation) using polyethylene glycol as the standard material.

The asphalt emulsion composition of the present invention contains the component (A) in an amount of 0.01 to 10% by weight, preferably 0.1 to 10% by weight and more preferably 0.1 to 1% by weight from the viewpoint of miscibility with aggregates.

Component (B)

In the formulae (1) and (2), R has 8 to 22 carbon atoms. As the hydrocarbon, an alkyl group or an alkenyl group is preferable and mixed alkyl groups such as a beef tallow alkyl group are also preferable. In the formula (1), m is a number of from 2 to 10, preferably from 2 to 5. Also, in the formula (2), X is a number from 1 to 5, preferably 1 to 3. Y and Z denote a number of from 0 to 5. Y is preferably a number of from 0 to 3 and Z is preferably a number of from 1 to 4. Y and Z are not 0 at the same time. It is to be noted that the polyamine represented by the formula (1) and the polyamine represented by the formula (2) may be used together. The polyamine represented by the formula (1) is preferable.

When it is intended to obtain, for example, 1 mol of the compound of the formula (1) as the component (B), 1.4 to (m+2) mols of acrylonitrile is cyanoethylated and then hydrogenated to prepare the compound.

The polyamine of the component (B) functions as a cationic surfactant by cationically ionizing it by using an acid. The acid is usually used such that the pH (25° C.) of an aqueous mixture containing the component (B) (for example, a mixture containing the components (A), (B) and (C) and water) becomes 1 to 7. For example, the pH is preferably 1.5 to 3 in the case of hydrochloric acid and around 6 in the case of acetic acid. In this range, good emulsifiablity and emulsion stability are obtained. Therefore, problems concerning corrosions of an emulsifier, storage containers and the like and problems concerning costs scarcely arise. As examples of the acid, hydrochloric acid, phosphoric acid, sulfuric acid, nitric acid, acetic acid and glycolic acid are given. Among these acids, hydrochloric acid and phosphoric acid are preferable.

The asphalt emulsion composition of the present invention contains the component (B) in an amount of 0.01 to 10% by weight, preferably 0.01 to 1% by weight and more preferably 0.1 to 1% by weight in its structure before cationically ionized using an acid in view of emulsifiability and anti-peeling durability of aggregates.

Component (C)

It is desirable that the asphalt emulsion composition of the present invention further contains a nonionic surfactant as the component (C).

Examples of the nonionic surfactant include polyoxyalkylene alkyl ether, polyoxyalkylene alkylphenyl ether, polyoxyalkylene sorbitan fatty acid ester, polyoxyalkylene glycol fatty acid ester and polyoxyethylene polyoxypropylene block polymer. Among these surfactants, polyoxyalkylene alkyl ether and polyoxyalkylene alkylphenyl ether are desirable. The number of carbons in each alkyl group of polyoxyalkylene alkyl ether and polyoxyalkylene alkylphenyl ether is preferably 8 to 22 and preferably 12 to 18. The alkylene oxide to be added preferably contains ethylene oxide (hereinafter transcribed as EO). In the case of single EO, the number of average addition mols of EO is 10 to 200 and preferably 15 to 100. The HLB (HLB of Griffin) of the nonionic surfactant is preferably 15 to 19.

The asphalt emulsion composition of the present invention contains the component (C) in an amount of 0.01 to 10% by weight, preferably 0.01 to 1% by weight and more preferably 0.1 to 1% by weight from the standpoint of the storage stability of the composition.

Moreover a more preferable embodiment of the asphalt emulsion composition of the present invention comprises 0.01 to 1% by weight of the component (A), 0.01 to 1% by weight of the component (B) and 0.01 to 1% by weight of the component (C)

Other additives

It is preferable that the asphalt emulsion composition of the present invention further contains one or more compounds selected from quaternary salt type cationic surfactants having preferably 1 to 3 hydrocarbon groups and preferably alkyl groups or alkenyl groups having 8 to 22 and preferably 12 to 18 carbon atoms, aliphatic amines having such an alkyl or alkenyl group, aminated lignin, imidazoline, betaine having an alkyl or alkenyl group and amidobetaine having an alkyl or alkenyl group in an amount of 0.01 to 10% by weight and more preferably 0.1 to 1% by weight in light of emulsifiability. Among the aforementioned compounds, aliphatic amines and imidazoline are particularly preferable.

The total amount of the components (A), (B) and (C) in the asphalt emulsion composition is in a range preferably from 0.3 to 5% by weight, more preferably from 0.5 to 2% by weight and particularly preferably from 0.5 to 1% by weight as solid content. In this range, good emulsifiability and emulsion stability are obtained.

The asphalt emulsion composition of the present invention may contain latexes such as styrene/butadiene, chloroprene and neoprene for the purpose of improving the durability of a road. The methods of adding these latexes include a method of adding them to a water-soluble salt of the alkylamine and a method of adding them to the emulsion composition and any method may be used. These latexes may be added to the extent that the stability of the emulsion composition, the emulsion stability of the emulsion composition, the miscibility of the emulsion composition with aggregates during paving and the hardness of the emulsion composition after paved are not impaired.

Also, the emulsion composition may contain an alkylamine or alkylpolyamine other than the component (B), fatty acid amidoamine, higher fatty acid, higher alcohol and inorganic salts such as calcium chloride, sodium chloride and potassium chloride as additives or emulsifying adjuvants for the purpose of improving the storage stability and workability of the emulsion composition. The emulsion composition may contain water-soluble polymers such as carboxymethyl cellulose, hydroxyethyl cellulose and polyvinyl alcohol for the purpose of improving the storage stability and viscosity of the emulsion composition. Moreover, the emulsion composition may contain polyphenol compounds such as tannin for the purpose of improving adhesion between aggregates and asphalt. These additives and emulsifying adjuvants may be added to the extent that the stability of the asphalt emulsion composition, the emulsion stability of the emulsion composition, the miscibility of the emulsion composition with aggregates during paving and the hardness of the emulsion composition after paved are not impaired.

The asphalt emulsion composition of the present invention contains asphalt and water. Given as examples of the asphalt are those used usually for road paving such as straight asphalt, semi-blown asphalt, blown asphalt and asphalt which is reformed using a polymer, tar and coal tar. The content of the asphalt in the emulsion composition is 40 to 75% by weight, preferably 50 to 70% by weight and more preferably 55 to 65% from the viewpoint of workability and stability. The content of water in the composition is 25 to 60% by weight and preferably 35 to 45% by weight.

The asphalt emulsion composition of the present invention has a pH of 1 to 7 and preferably 1 to 4 at 25° C.

Asphalt emulsion compositions, particularly cationic slow-set asphalt emulsion compositions are generally produced by feeding an aqueous amine solution and asphalt to an emulsifier such as a colloid mill at the same time. The asphalt emulsion composition of the present invention can be obtained by mixing the components (A), (B) and (C) and water, adjusting the mixture to a given pH by using an acid such as hydrochloric acid and then mixing and emulsifying the mixture and asphalt, after they are respectively heated, by using an emulsifier such as a colloid mill. It is desirable that when the emulsion composition is produced, the temperature of the asphalt be 110° C. to 170° C. and the temperature of the mixture containing the components (A), (B) and (C) and water be 30° C. to 60° C.

Also, the composition obtained by mixing the components (A), (B) and (C) with water may be used for the preparation of the emulsifier used when the aforementioned asphalt emulsion is obtained. The composition may be used at a given pH for use. The content of water in the composition is preferably 5 to 70% by weight and particularly preferably 40 to 60% by weight. The composition may be used according to the method of producing the above asphalt emulsion. The ratio by weight of each component in the composition is as follows: when the content of the component (A) is 1, the contents of the components (B) and (C) are preferably 0.02 to 3 and 0.1 to 10, respectively, more preferably 0.05 to 1 and 0.3 to 4, particularly preferably 0.1 to 0.5 and 0.5 to 1.5. Further, the composition may contain, besides the components (A) to (C), the components described in the preparation of the aforementioned asphalt emulsion according to the need.

Also in the emulsion composition containing the components (A) and (B), the content by weight of the component (B) is preferably 0.02 to 3, more preferably 0.05 to 1 and particularly preferably 0.1 to 0.5 per 1 of the component (A).

The asphalt emulsion composition produced in the above manner according to the present invention is preferably used in a slurry seal method of construction in which aggregates, water, cement, fillers such as calcium hydroxide and additives are mixed on a car and the mixture is paved on the surface of a road and is preferably used to repair a cave-in and cracks of roads. The asphalt emulsion composition of the present invention is suitable as a cationic slow-set asphalt emulsion composition.

EXAMPLES

Example 1

1.0 g of beef tallow alkyl straight-chain tetramine, 3.5 g of polyoxyethylene nonylphenyl ether (EOp=35, EOp is the number of average addition mols of EO, the same as follows, HLB: 17.5), 4.0 g of kraft lignin (DIWATEX, manufactured by Borregard, Mw1: 2000) and water were mixed and the mixture was adjusted to pH 2 (25° C.) by using HCl to prepare 400 g of an aqueous solution. 600 g of asphalt having a penetration of 60 to 80 and heated to 150° C. and the above aqueous solution heated to 40° C. were emulsified using a colloid mill to obtain an asphalt emulsion composition (pH (25° C.)=3).

Example 2

An asphalt emulsion composition was obtained in the same manner as in Example 1 except that as the kraft lignin, one having a Mw of 44000 was used in Example 1.

Example 3

An asphalt emulsion composition was obtained in the same manner as in Example 1 except that beef tallow alkyl branched tetramine was used in place of the beef tallow alkyl straight-chain tetramine in Example 1.

Example 4

An asphalt emulsion composition was obtained in the same manner as in Example 1 except that beef tallow alkyl straight-chain triamine was used in place of the beef tallow alkyl straight-chain tetramine in Example 1.

Example 5

An asphalt emulsion composition was obtained in the same manner as in Example 1 except that alkyl straight-chain tetramine whose alkyl group had 18 carbon atoms was used in place of the beef tallow alkyl straight-chain tetramine in Example 1.

Example 6

An asphalt emulsion composition was obtained in the same manner as in Example 1 except that alkyl straight-chain tetramine whose alkyl group had 8 carbon atoms was used in place of the beef tallow alkyl straight-chain tetramine in Example 1.

Example 7

An asphalt emulsion composition was obtained in the same manner as in Example 1 except that alkyl straight-chain tetramine whose alkyl group had 22 carbon atoms was used in place of the beef tallow alkyl straight-chain tetramine in Example 1.

Example 8

An asphalt emulsion composition was obtained in the same manner as in Example 1 except that polyoxyethylene nonylphenyl ether (EOp=17.5, HLB=15.5) was used in place of polyoxyethylene nonylphenyl ether (EOp=35) in Example 1.

Example 9

An asphalt emulsion composition was obtained in the same manner as in Example 1 except that polyoxyethylene nonylphenyl ether (EOp=50, HLB=18.2) was used in place of polyoxyethylene nonylphenyl ether (EOp=35) in Example 1.

Example 10

An asphalt emulsion composition was obtained in the same manner as in Example 1 except that polyoxyethylene lauryl ether (EOp=30, HLB=18.1) was used in place of polyoxyethylene nonylphenyl ether (EOp=35) in Example 1.

Example 11

An asphalt emulsion composition was obtained in the same manner as in Example 1 except that polyoxyethylene oleyl ether (EOp=35, HLB=16.2) was used in place of polyoxyethylene nonylphenyl ether (EOp=35) in Example 1.

Example 12

An asphalt emulsion composition was obtained in the same manner as in Example 1 except that polyoxyethylene nonylphenyl ether (EOp=5, HLB=9.8) was used in place of polyoxyethylene nonylphenyl ether (EOp=35) in Example 1.

Example 13

An asphalt emulsion composition was obtained in the same manner as in Example 1 except that polyoxyethylene nonylphenyl ether (EOp=250, HLB=19.3) was used in place of polyoxyethylene nonylphenyl ether (EOp=35) in Example 1.

Example 14

An asphalt emulsion composition was obtained in the same manner as in Example 3 except that alkyl branched tetramine whose alkyl group had 18 carbon atoms was used in place of the beef tallow alkyl branched tetramine in Example 3.

Example 15

An asphalt emulsion composition was obtained in the same manner as in Example 3 except that alkyl branched tetramine whose alkyl group had 8 carbon atoms was used in place of the beef tallow alkyl branched tetramine in Example 3.

Example 16

An asphalt emulsion composition was obtained in the same manner as in Example 3 except that alkyl branched tetramine whose alkyl group had 22 carbon atoms was used in place of the beef tallow alkyl branched tetramine in Example 3.

Example 17

An asphalt emulsion composition was obtained in the same manner as in Example 3 except that polyoxyethylene nonylphenyl ether (EOp=17.5, HLB=15.5) was used in place of polyoxyethylene nonylphenyl ether (EOp=35) in Example 3.

Example 18

An asphalt emulsion composition was obtained in the same manner as in Example 3 except that polyoxyethylene nonylphenyl ether (EOp=50, HLB=18.2) was used in place of polyoxyethylene nonylphenyl ether (EOp=35) in Example 3.

Example 19

An asphalt emulsion composition was obtained in the same manner as in Example 3 except that polyoxyethylene lauryl ether (EOp=30, HLB=18.1) was used in place of polyoxyethylene nonylphenyl ether (EOp=35) in Example 3.

Example 20

An asphalt emulsion composition was obtained in the same manner as in Example 3 except that polyoxyethylene oleyl ether (EOp=35, HLB=16.2) was used in place of polyoxyethylene nonylphenyl ether (EOp=35) in Example 3.

Example 21

An asphalt emulsion composition was obtained in the same manner as in Example 3 except that polyoxyethylene nonylphenyl ether (EOp=5, HLB=9.8) was used in place of polyoxyethylene nonylphenyl ether (EOp=35) in Example 3.

Example 22

An asphalt emulsion composition was obtained the same manner as in Example 3 except that polyoxyethylene nonylphenyl ether (EOp=250, HLB=19.3) was used in place of polyoxyethylene nonylphenyl ether (EOp=35) in Example 3.

Comparative Example 1

An asphalt emulsion composition was obtained in the same manner as in Example 1 except that as the kraft lignin, one having a Mw of 3000 was used in Example 1.

Comparative Example 2

An asphalt emulsion composition was obtained in the same manner as in Example 1 except that as the kraft lignin, one having a Mw of 67000 was used in Example 1.

Comparative Example 3

An asphalt emulsion composition was obtained in the same manner as in Example 1 except that sodium ligninsulfonate (Mw: 10000) was used in place of the kraft lignin in Example 1.

Comparative Example 4

An asphalt emulsion composition was obtained in the same manner as in Example 1 except that formalin naphthalenesulfonate condensate (Mw: 13000) was used in place of the kraft lignin in Example 1.

Comparative Example 5

An asphalt emulsion composition was obtained in the same manner as in Example 1 except that beef tallow alkyldiamine was used in place of beef tallow alkyl straight-chain tetramine in Example 1.

Comparative Example 6

An asphalt emulsion composition was obtained in the same manner as in Example 1 except that alkyl straight-chain tetramine whose alkyl group had 6 carbon atoms was used in place of beef tallow alkyl straight-chain tetramine in Example 1.

Comparative Example 7

An asphalt emulsion composition was obtained in the same manner as in Example 1 except that alkyl straight-chain tetramine whose alkyl group had 24 carbon atoms was used in place of beef tallow alkyl straight-chain tetramine in Example 1.

Evaluation of the Performance

Using the aforementioned emulsion compositions, the storage stability (one day), residue on sieve, viscosity (Saybolt furol) and miscibility with cement were evaluated by a test method according to ASTM D-3910. Also, the miscibility with aggregates was measured by a test method according to ISSA TB-113 Trial Mix procedure for Slurry Seal Design and the amount of aggregates to be peeled off was measured by a test method (as will be described later in detail) according to ISSA TB-100 Wet Track Abrasion Test to evaluate. The results are shown together with the standard value of ASTM in Tables 1 to 7. It is required for asphalt emulsion compositions for slurry seal to clear the ASTM standard values in all of these tests.

(1) Miscibility with Aggregates

Using the aforementioned asphalt emulsion compositions, the characteristics required for a slow-set slurry seal were measured according to a method shown in Design Technical Bulletins of International Slurry Surfacing Association (ASTM) to evaluate. The aggregates used for evaluation were basalt from Thailand and the size distribution was made to accord with the Type II described in ASTM A105. Basalt has been heretofore regarded as an aggregate hard to handle in slurry seal paving because it causes an emulsion to decompose rapidly. Also, normal Portland cement was used as the filler. The aggregate-mixing time was evaluated according to the method of ASTM No. 102. It is desirable that the aggregate-mixing time be longer because the workability is improved and the operational time can be secured. It is necessary to take 180 seconds or more to mix the emulsion with the aggregates sufficiently and to pave the mixture. Particularly when outside air temperature is high during paving, mixing time is made short because demulsification progresses rapidly. Also, the emulsion tends to be affected by paving conditions such as the type of aggregate and therefore an emulsion which is unaffected by these conditions is regarded as an ideal emulsion. As to the mixing time, an emulsion ensuring a sufficient mixing time as long as 300 seconds or more at ambient temperature is ideal.

(2) Amount of Aggregates to be Peeled

The amount of aggregates to be peeled is an index of the durability of a road after it is hardened and may be evaluated by measuring the durability of the hardened mixture, by the wet Track Abration Test according to ASTM No.100, when it is immersed in water. In this test, the hardened sample is immersed in water and a tire roller is made to rotate to thereby peel off the surface of the sample forcedly. The durability is measured based on the amount of aggregates to be peeled off for a fixed time. The smaller the peeled amount is, the better the quality of the sample is. It is prescribed in ASTM that the peeled amount is 807 $g/m^2$ or less.

TABLE 1

| Component | | Compound | Amount to be added (g) | Concentration of asphalt (weight %) | Storage stability (%) | Residue on sieve (%) | Viscosity (second) | Miscibility with cement (%) | Miscibility with aggregates (second) | Amount of aggregates to be peeled ($g/m^2$) |
|---|---|---|---|---|---|---|---|---|---|---|
| Example 1 | (A) | Craft lignin [Mw12000] | 4.0 | 60.5 | 0.6 | 0.0 | 21 | 0.0 | 300 | 250 |
| | (B) | $R^1$—(NHCH$_2$CH$_2$CH$_2$)$_3$—NH$_2$ [$R^1$ = Beef tallow alkyl] | 1.0 | | | | | | | |
| | (C) | $R^2$—O(EO)$_{35}$—H [$R^2$ = Nonylphenyl] | 3.5 | | | | | | | |
| Example 2 | (A) | Craft lignin [Mw44000] | 4.0 | 60.5 | 0.6 | 0.0 | 20 | 0.0 | 300 | 320 |
| | (B) | $R^1$—(NHCH$_2$CH$_2$CH$_2$)$_3$—NH$_2$ [$R^1$ = Beef tallow alkyl] | 1.0 | | | | | | | |
| | (C) | $R^2$—O(EO)$_{35}$—H [$R^2$ = Nonylphenyl] | 3.5 | | | | | | | |
| Example 3 | (A) | Craft lignin [Mw12000] | 4.0 | 60.5 | 0.8 | 0.0 | 21 | 0.0 | 300 | 250 |
| | (B) | (CH$_2$)$_3$—NH$_2$<br>R—N—(CH$_2$)$_3$—NH—(CH$_2$)$_3$—NH$_2$<br>[$R^1$ = Beef tallow alkyl] | 1.0 | | | | | | | |
| | (C) | $R^2$—O(EO)$_{35}$—H [$R^2$ = Nonylphenyl] | 3.5 | | | | | | | |
| Example 4 | (A) | Craft lignin [Mw12000] | 4.0 | 60.5 | 0.9 | 0.0 | 21 | 0.0 | 300 | 350 |
| | (B) | $R^1$—(NHCH$_2$CH$_2$CH$_2$)$_2$—NH$_2$ [$R^1$ = Beef tallow alkyl] | 1.0 | | | | | | | |
| | (C) | $R^2$—O(EO)$_{35}$—H [$R^2$ = Nonylphenyl] | 3.5 | | | | | | | |
| Example 5 | (A) | Craft lignin [Mw12000] | 4.0 | 60.5 | 0.6 | 0.0 | 21 | 0.0 | 300 | 250 |
| | (B) | $R^1$—(NHCH$_2$CH$_2$CH$_2$)$_3$—NH$_2$ [$R^1$ = C$_{18}$Alkyl] | 1.0 | | | | | | | |
| | (C) | $R^2$—O(EO)$_{35}$—H [$R^2$ = Nonylphenyl] | 3.5 | | | | | | | |
| Standard value of ASTM | | | | | 1.0 or less | 0.1 or less | 20 or more | 2.0 or less | 180 or more | 807 or less |

(Note)
In the table, the amount to be added in one in 1000 g of the asphalt emulsion composition (the same as follows)

TABLE 2

| Component | | Compound | Amount to be added (g) | Concentration of asphalt (weight %) | Storage stability (%) | Residue on sieve (%) | Viscosity (second) | Miscibility with cement (%) | Miscibility with aggregates (second) | Amount of aggregates to be peeled ($g/m^2$) |
|---|---|---|---|---|---|---|---|---|---|---|
| Example 6 | (A) | Craft lignin [Mw12000] | 4.0 | 60.5 | 0.9 | 0.0 | 21 | 0.0 | 300 | 680 |
| | (B) | $R^1$—(NHCH$_2$CH$_2$CH$_2$)$_3$—NH$_2$ [$R^1$ = C$_8$Alkyl] | 1.0 | | | | | | | |
| | (C) | $R^2$—O(EO)$_{35}$—H [$R^2$ = Nonylphenyl] | 3.5 | | | | | | | |
| Example 7 | (A) | Craft lignin [Mw12000] | 4.0 | 60.5 | 0.6 | 0.0 | 21 | 0.0 | 300 | 350 |
| | (B) | $R^1$—(NHCH$_2$CH$_2$CH$_2$)$_3$—NH$_2$ [$R^1$ = C$_{22}$Alkyl] | 1.0 | | | | | | | |
| | (C) | $R^2$—O(EO)$_{35}$—H [$R^2$ = Nonylphenyl] | 3.5 | | | | | | | |
| Example 8 | (A) | Craft lignin [Mw12000] | 4.0 | 60.5 | 1.0 | 0.0 | 20 | 0.0 | 190 | 380 |
| | (B) | $R^1$—(NHCH$_2$CH$_2$CH$_2$)$_3$—NH$_2$ [$R^1$ = Beef tallow alkyl] | 1.0 | | | | | | | |
| | (C) | $R^2$—O(EO)$_{17.5}$—H [$R^2$ = Nonylphenyl] | 3.5 | | | | | | | |
| Example 9 | (A) | Craft lignin [Mw12000] | 4.0 | 60.5 | 0.7 | 0.0 | 20 | 0.0 | 250 | 430 |
| | (B) | $R^1$—(NHCH$_2$CH$_2$CH$_2$)$_3$—NH$_2$ [$R^1$ = Beef tallow alkyl] | 1.0 | | | | | | | |
| | (C) | $R^2$—O(EO)$_{50}$—H [$R^2$ = Nonylphenyl] | 3.5 | | | | | | | |

TABLE 2-continued

| | Component | Compound | Amount to be added (g) | Concentration of asphalt (weight %) | Storage stability (%) | Residue on sieve (%) | Viscosity (second) | Miscibility with cement (%) | Miscibility with aggregates (second) | Amount of aggregates to be peeled (g/m²) |
|---|---|---|---|---|---|---|---|---|---|---|
| Example 10 | (A) | Craft lignin [Mw12000] | 4.0 | 60.5 | 0.8 | 0.0 | 20 | 0.0 | 300 | 490 |
| | (B) | R¹—(NHCH₂CH₂CH₂)₃—NH₂ [R¹ = Beef tallow alkyl] | 1.0 | | | | | | | |
| | (C) | R²—O(EO)₃₀—H [R² = lauryl] | 3.5 | | | | | | | |
| | | Standard value of ASTM | | | 1.0 or less | 0.1 or less | 20 or more | 2.0 or less | 180 or more | 807 or less |

TABLE 3

| | Component | Compound | Amount to be added (g) | Concentration of asphalt (weight %) | Storage stability (%) | Residue on sieve (%) | Viscosity (second) | Miscibility with cement (%) | Miscibility with aggregates (second) | Amount of aggregates to be peeled (g/m²) |
|---|---|---|---|---|---|---|---|---|---|---|
| Example 11 | (A) | Craft lignin [Mw12000] | 4.0 | 60.5 | 0.8 | 0.0 | 20 | 0.0 | 300 | 490 |
| | (B) | R¹—(NHCH₂CH₂CH₂)₃—NH₂ [R¹ = Beef tallow alkyl] | 1.0 | | | | | | | |
| | (C) | R²—O(EO)₃₅—H [R² = Oleyl] | 3.5 | | | | | | | |
| Example 12 | (A) | Craft lignin [Mw12000] | 4.0 | 60.5 | 1.0 | 0.1 | 20 | 0.0 | 300 | 660 |
| | (B) | R¹—(NHCH₂CH₂CH₂)₃—NH₂ [R¹ = Beef tallow alkyl] | 1.0 | | | | | | | |
| | (C) | R²—O(EO)₅—H [R² = Nonylphenyl] | 3.5 | | | | | | | |
| Example 13 | (A) | Craft lignin [Mw12000] | 4.0 | 60.5 | 1.0 | 0.1 | 20 | 0.0 | 300 | 480 |
| | (B) | R¹—(NHCH₂CH₂CH₂)₃—NH₂ [R¹ = Beef tallow alkyl] | 1.0 | | | | | | | |
| | (C) | R²—O(EO)₂₅₀—H [R² = Nonylphenyl] | 3.5 | | | | | | | |
| Example 14 | (A) | Craft lignin [Mw12000] | 4.0 | 60.5 | 0.5 | 0.0 | 20 | 0.0 | 300 | 200 |
| | (B) | (CH₂)₃—NH₂<br>R—N—(CH₂)₃—NH—(CH₂)₃—NH₂ [R¹ = C₁₈Alkyl] | 1.0 | | | | | | | |
| | (C) | R²—O(EO)₃₅—H [R² = Nonylphenyl] | 3.5 | | | | | | | |
| Example 15 | (A) | Craft lignin [Mw12000] | 4.0 | 60.5 | 0.8 | 0.0 | 20 | 0.0 | 300 | 580 |
| | (B) | (CH₂)₃—NH₂<br>R—N—(CH₂)₃—NH—(CH₂)₃—NH₂ [R¹ = C₈Alkyl] | 1.0 | | | | | | | |
| | (C) | R²—O(EO)₃₅—H [R² = Nonylphenyl] | 3.5 | | | | | | | |
| | | Standard value of ASTM | | | 1.0 or less | 0.1 or less | 20 or more | 2.0 or less | 180 or more | 807 or less |

TABLE 4

| | Component | Compound | Amount to be added (g) | Concentration of asphalt (weight %) | Storage stability (%) | Residue on sieve (%) | Viscosity (second) | Miscibility with cement (%) | Miscibility with aggregates (second) | Amount of aggregates to be peeled (g/m²) |
|---|---|---|---|---|---|---|---|---|---|---|
| Example 16 | (A) | Craft lignin [Mw12000] | 4.0 | 60.5 | 0.5 | 0.0 | 20 | 0.0 | 300 | 250 |
| | (B) | (CH₂)₃—NH₂<br>R—N—(CH₂)₃—NH—(CH₂)₃—NH₂ [R¹ = C₂₂Alkyl] | 1.0 | | | | | | | |
| | (C) | R²—O(EO)₃₅—H [R² = Nonylphenyl] | 3.5 | | | | | | | |
| Example 17 | (A) | Craft lignin [Mw12000] | 4.0 | 60.5 | 0.9 | 0.0 | 20 | 0.0 | 190 | 280 |
| | (B) | (CH₂)₃—NH₂<br>R—N—(CH₂)₃—NH—(CH₂)₃—NH₂ [R¹ = Beef tallow alkyl] | 1.0 | | | | | | | |
| | (C) | R²—O(EO)₁₇.₅—H [R² = Nonylphenyl] | 3.5 | | | | | | | |
| Example 18 | (A) | Craft lignin [Mw12000] | 4.0 | 60.5 | 0.6 | 0.0 | 20 | 0.0 | 250 | 330 |
| | (B) | (CH₂)₃—NH₂<br>R—N—(CH₂)₃—NH—(CH₂)₃—NH₂ [R¹ = Beef tallow alkyl] | 1.0 | | | | | | | |
| | (C) | R²—O(EO)₅₀—H [R² = Nonylphenyl] | 3.5 | | | | | | | |
| Example 19 | (A) | Craft lignin [Mw12000] | 4.0 | 60.5 | 0.7 | 0.0 | 20 | 0.0 | 300 | 390 |
| | (B) | (CH₂)₃—NH₂<br>R—N—(CH₂)₃—NH—(CH₂)₃—NH₂ [R¹ = Beef tallow alkyl] | 1.0 | | | | | | | |
| | (C) | R²—O(EO)₃₀—H [R² = lauryl] | 3.5 | | | | | | | |
| | | Standard value of ASTM | | | 1.0 or less | 0.1 or less | 20 or more | 2.0 or less | 180 or more | 807 or less |

TABLE 5

| | Component | Compound | Amount to be added (g) | Concentration of asphalt (weight %) | Storage stability | Residue on sieve (%) | Viscosity (second) | Miscibility with cement (%) | Miscibility with aggregates (second) | Amount of aggregates to be peeled (g/m²) |
|---|---|---|---|---|---|---|---|---|---|---|
| Example 20 | (A) | Craft lignin [Mw12000] | 4.0 | 60.5 | 0.7 | 0.0 | 20 | 0.0 | 300 | 390 |
| | (B) | (CH$_2$)$_3$—NH$_2$<br>R—N—(CH$_2$)$_3$—NH—(CH$_2$)$_3$—NH$_2$ [R$^1$ = Beef tallow alkyl] | 1.0 | | | | | | | |
| | (C) | R$^2$—O(EO)$_{35}$—H [R$^2$ = oleyl] | 3.5 | | | | | | | |
| Example 21 | (A) | Craft lignin [Mw12000] | 4.0 | 60.5 | 1.0 | 0.1 | 20 | 0.0 | 300 | 360 |
| | (B) | (CH$_2$)$_3$—NH$_2$<br>R—N—(CH$_2$)$_3$—NH—(CH$_2$)$_3$—NH$_2$ [R$^1$ = Beef tallow alkyl] | 1.0 | | | | | | | |
| | (C) | R$^2$—O(EO)$_5$—H [R$^2$ = Nonylphenyl] | 3.5 | | | | | | | |
| Example 22 | (A) | Craft lignin [Mw12000] | 4.0 | 60.5 | 1.2 | 0.1 | 20 | 0.0 | 300 | 380 |
| | (B) | (CH$_2$)$_3$—NH$_2$<br>R—N—(CH$_2$)$_3$—NH—(CH$_2$)$_3$—NH$_2$ [R$^1$ = Beef tallow alkyl] | 1.0 | | | | | | | |
| | (C) | R$^2$—O(EO)$_{250}$—H [R$^2$ = Nonylphenyl] | 3.5 | | | | | | | |
| | | Standard value of ASTM | | | 1.0 or less | 0.1 or less | 20 or more | 2.0 or less | 180 or more | 807 or less |

TABLE 6

| | Component | Compound | Amount to be added (g) | Concentration of asphalt (weight %) | Storage stability (%) | Residue on sieve (%) | Viscosity (second) | Miscibility with cement (%) | Miscibility with aggregates (second) | Amount of aggregates to be peeled (g/m²) |
|---|---|---|---|---|---|---|---|---|---|---|
| Comparative Example 1 | (A) | Craft lignin [Mw3000] | 4.0 | 60.5 | 1.0 | 0.0 | 20 | 0.0 | 150 | 1100 |
| | (B) | R$^1$—(NHCH$_2$CH$_2$CH$_2$)$_3$—NH$_2$ [R$^1$ = Beef tallow alkyl] | 1.0 | | | | | | | |
| | (C) | R$^2$—O(EO)$_{35}$—H [R$^2$ = Nonylphenyl] | 3.5 | | | | | | | |
| Comparative Example 2 | (A) | Craft lignin [Mw67000] | 4.0 | 60.5 | 1.0 | 0.0 | 20 | 0.5 | 160 | 1000 |
| | (B) | R$^1$—(NHCH$_2$CH$_2$CH$_2$)$_3$—NH$_2$ [R$^1$ = Beef tallow alkyl] | 1.0 | | | | | | | |
| | (C) | R$^2$—O(EO)$_{35}$—H [R$^2$ = Nonylphenyl] | 3.5 | | | | | | | |
| Comparative Example 3 | (A) | Sodium ligninsulfonate [Mw10000] | 4.0 | 60.5 | 6.9 | 0.05 | 20 | 0.0 | 300 | 790 |
| | (B) | R$^1$—(NHCH$_2$CH$_2$CH$_2$ )$_3$—NH$_2$ [R$^1$ = Beef tallow alkyl] | 1.0 | | | | | | | |
| | (C) | R$^2$—O(EO)$_{35}$—H [R$^2$ = Nonylphenyl] | 3.5 | | | | | | | |
| Comparative Example 4 | (A) | Formalin naphthalenesulfonate condensate [Mw13000] | 4.0 | 60.5 | 12.0 | 0.03 | 20 | 0.0 | 300 | 760 |
| | (B) | R$^1$—(NHCH$_2$CH$_2$CH$_2$)$_3$—NH$_2$ [R$^1$ = Beef tallow alkyl] | 1.0 | | | | | | | |
| | (C) | R$^2$—O(EO)$_{35}$—H [R$^2$ = Nonylphenyl] | 3.5 | | | | | | | |
| | | Standard value of ASTM | | | 1.0 or less | 0.1 or less | 20 or more | 2.0 or less | 180 or more | 807 or less |

TABLE 7

| | Component | Compound | Amount to be added (g) | Concentration of asphalt (weight %) | Storage stability (%) | Residue on sieve (%) | Viscosity (second) | Miscibility with cement (%) | Miscibility with aggregates (second) | Amount of aggregates to be peeled (g/m²) |
|---|---|---|---|---|---|---|---|---|---|---|
| Comparative Example 5 | (A) | Craft lignin [Mw12000] | 4.0 | 60.5 | 2.8 | 0.0 | 21 | 0.0 | 150 | 960 |
| | (B) | R$^1$—(NHCH$_2$CH$_2$CH$_2$)—NH$_2$ [R$^1$ = Beef tallow alkyl] | 1.0 | | | | | | | |
| | (C) | R$^2$—O(EO)$_{35}$—H [R$^2$ = Nonylphenyl] | 3.5 | | | | | | | |
| Comparative Example 6 | (A) | Craft lignin [Mw12000] | 4.0 | 60.5 | 2.7 | 0.0 | 21 | 0.0 | 220 | 970 |
| | (B) | R$^1$—(NHCH$_2$CH$_2$CH$_2$)$_3$—NH$_2$ [R$^1$ = C$_6$Alkyl] | 1.0 | | | | | | | |
| | (C) | R$^2$—O(EO)$_{35}$—H [R$^2$ = Nonylphenyl] | 3.5 | | | | | | | |

TABLE 7-continued

| Component | Compound | Amount to be added (g) | Concentration of asphalt (weight %) | Storage stability (%) | Residue on sieve (%) | Viscosity (second) | Miscibility with cement (%) | Miscibility with aggregates (second) | Amount of aggregates to be peeled (g/m²) |
|---|---|---|---|---|---|---|---|---|---|
| Comparative Example 7 | (A) Craft lignin [Mw12000]<br>(B) R¹—(NHCH₂CH₂CH₂)₃—NH₂ [R¹ = C₂₄Alkyl]<br>(C) R²—O(EO)₃₅—H [R² = Nonylphenyl] | 4.0<br>1.0<br>3.5 | 60.5 | 2.0 | 0.1 | 21 | 0.3 | 300 | 660 |
| | Standard value of ASTM | | | 1.0 or less | 0.1 or less | 20 or more | 2.0 or less | 180 or more | 807 or less |

What is claimed is:

1. A method for obtaining an asphalt emulsifier composition comprising the steps of
mixing 0.01 to 10% by weight of a kraft lignin (A) having a weight average molecular weight of 4000 to 60000, 0.01 to 10% by weight of at least one polyamine (B) selected from the group consisting of polyamines represented by the formula (1) and polyamines represented by the formula (2):

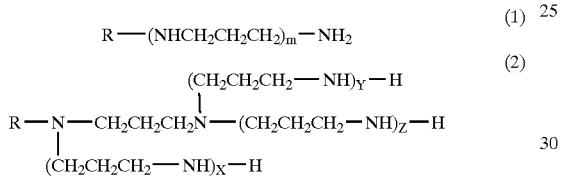

wherein R represents a saturated or unsaturated, straight-chain or branched hydrocarbon having 8 to 22 carbon atoms, m denotes a number from 2 to 10, X denotes a number from 1 to 5 and Y and Z denote a number from 0 to 5, provided that Y and Z are not 0 at the same time, and water; and
adding an acid to convert (B) into an amine salt thereof before or after the mixing step,
thereby producing said asphalt emulsifier composition.

2. The method according to claim 1, further comprising the step of adding 0.01 to 10% by weight of a nonionic surfactant (C).

3. The method according to claim 2, wherein the content of (A) is 0.01 to 1% by weight, the content of (B) is 0.01 to 1% by weight and the content of (C) is 0.01 to 1% by weight.

4. The method according to claim 1, wherein the acid is selected from the group consisting of hydrochloric acid, phosphoric acid, sulfuric acid, nitric acid, acetic acid and glycolic acid.

5. The method according to claim 1, wherein said asphalt emulsifier composition has a pH of 1 to 7.

6. The method according to claim 4, wherein the acid is hydrochloric acid and said asphalt emulsifier composition has a pH of 1.5 to 3.

7. The method according to claim 4, wherein the acid is acetic acid and said asphalt emulsifier composition has a pH of around 6.

8. A method for obtaining an asphalt emulsion composition comprising the steps of
mixing 0.01 to 10% by weight of a kraft lignin (A) having a weight-average molecular weight of 4000 to 60000, 0.01 to 10% by weight of at least one polyamine (5) selected from the group consisting of polyamines represented by the formula (1) and polyamines represented by the formula (2):

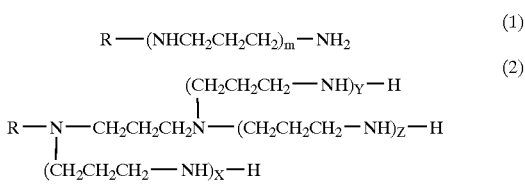

wherein R represents a saturated or unsaturated, straight-chain or branched hydrocarbon having 8 to 22 carbon atoms, m denotes a number from 2 to 10, X denotes a number from 1 to 5 and Y and Z denote a number from 0 to 5, provided that Y and Z are not 0 at the same time, and water;
adding an acid to convert (B) into an amine salt before or after the mixing step to form a mixture; and
mixing and emulsifying the mixture and asphalt,
thereby obtaining said asphalt emulsion composition.

9. The method according to claim 8, further comprising the step of adding 0.01 to 10% by weight of a nonionic surfactant (C).

10. The method according to claim 9, wherein the ratio by weight of (A), (B), and (C) is 1:0.02–3:0.1–10.

11. The method according to claim 8, wherein the acid is selected from the group consisting of hydrochloric acid, phosphoric acid, sulfuric acid, nitric acid, acetic acid and glycolic acid.

12. The method according to claim 8, wherein said asphalt emulsion composition has a pH of 1 to 7.

13. A method for increasing the storage stability of an asphalt emulsion comprising asphalt and water, said method comprising the steps of
mixing 0.01 to 10% by weight of a kraft lignin (A) having a weight-average molecular weight of 4000 to 60000 and 0.01 to 10% by weight of at least one polyamine (B) selected from the group consisting of polyamines represented by the formula (1) and polyamines represented by the formula (2):

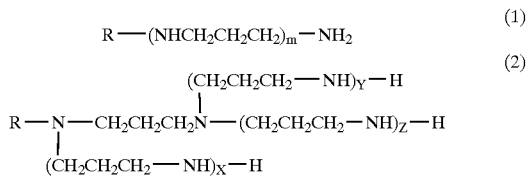

wherein R represents a saturated or unsaturated, straight-chain or branched hydrocarbon having 8 to 22 carbon atoms, m denotes a number from 2 to 10, X denotes a number from 1 to 5 and Y and Z denote a number from 0 to 5, provided that Y and Z are not 0 at the same time;

adding an acid to convert (B) into an amine salt thereof before or after the mixing step to form a mixture; and mixing and emulsifying the mixture and asphalt, thereby obtaining said asphalt emulsion which is storage stable.

* * * * *